F. M. COCKRELL, Jr.
SUGAR CANE STRIPPER AND TOPPER.
APPLICATION FILED JAN. 30, 1906.

976,850.

Patented Nov. 29, 1910.
3 SHEETS—SHEET 1.

F. M. COCKRELL, Jr.
SUGAR CANE STRIPPER AND TOPPER.
APPLICATION FILED JAN. 30, 1906.

976,850.

Patented Nov. 29, 1910.
3 SHEETS—SHEET 2.

Francis M. Cockrell Jr. Inventor

Witnesses

By
Attorney

F. M. COCKRELL, Jr.
SUGAR CANE STRIPPER AND TOPPER.
APPLICATION FILED JAN. 30, 1906.
976,850.
Patented Nov. 29, 1910.
3 SHEETS—SHEET 3.
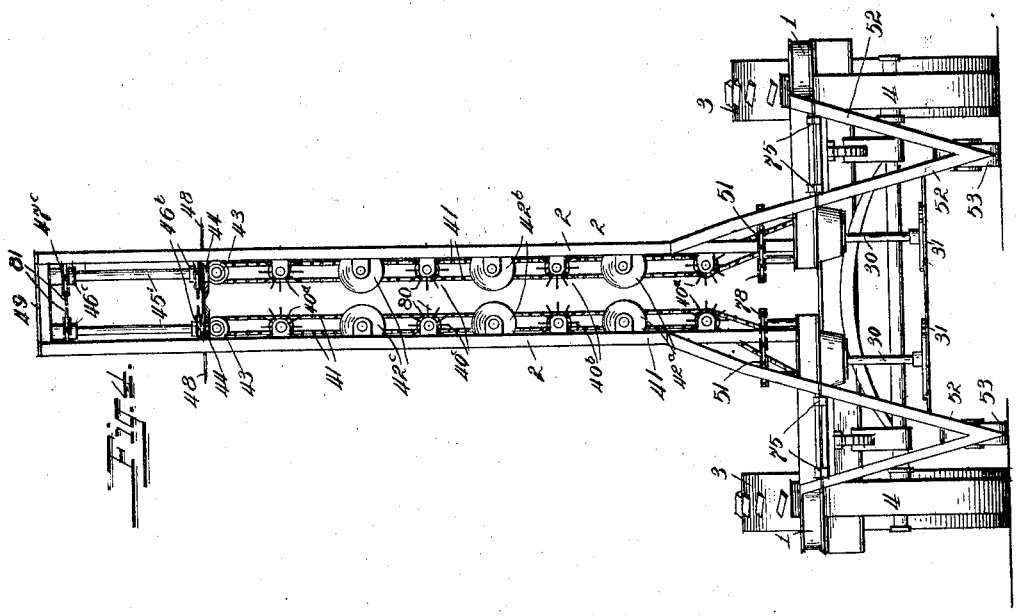
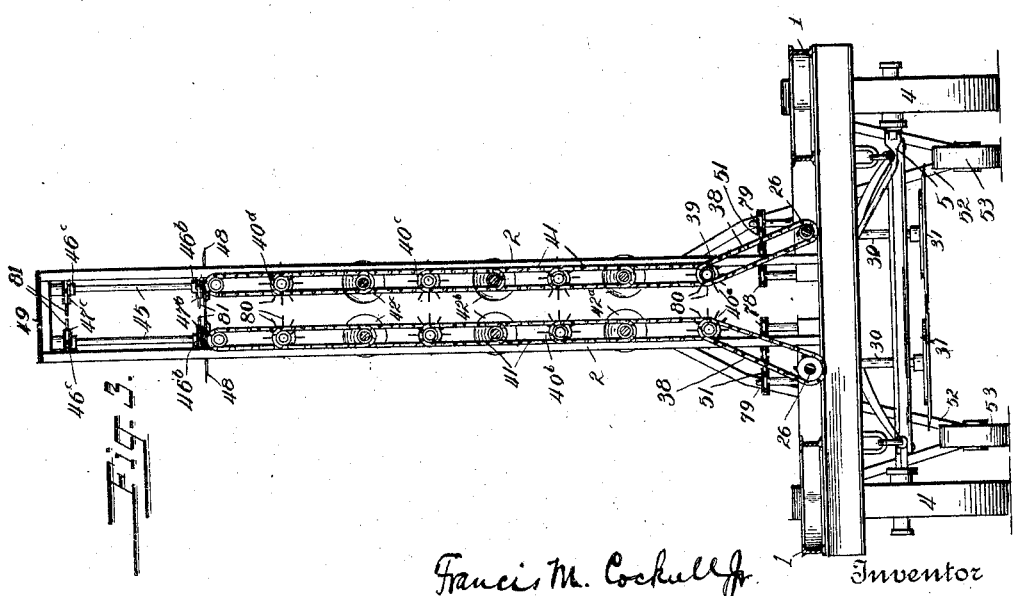

UNITED STATES PATENT OFFICE.

FRANCIS M. COCKRELL, JR., OF NEW ORLEANS, LOUISIANA.

SUGAR-CANE STRIPPER AND TOPPER.

976,850.  Specification of Letters Patent.  Patented Nov. 29, 1910.

Application filed January 30, 1906. Serial No. 298,626.

*To all whom it may concern:*

Be it known that I, FRANCIS M. COCKRELL, Jr., a citizen of the United States, residing at New Orleans, parish of Orleans, and State of Louisiana, have invented certain new and useful Improvements in Sugar-Cane Strippers and Toppers, of which the following is a specification.

This invention relates to sugar cane strippers and toppers.

Figure 1:
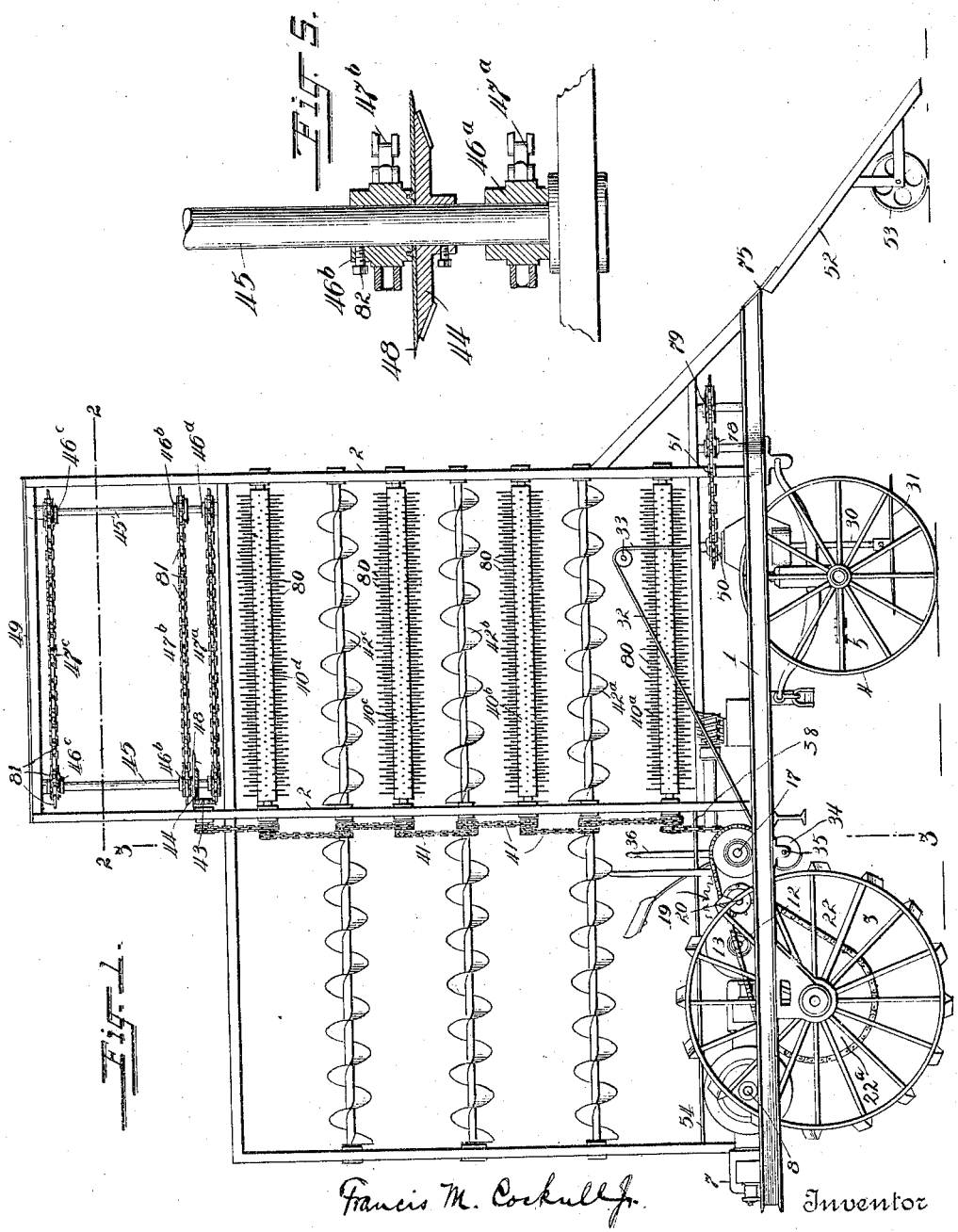
Figure 2:
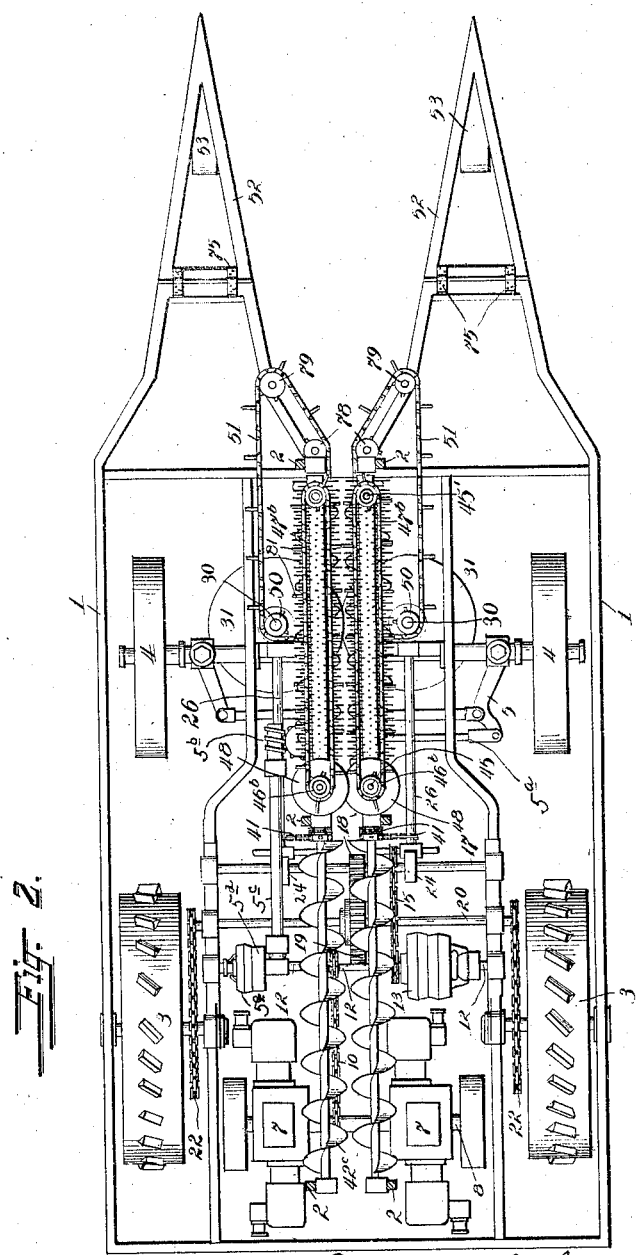

The object of the present invention is the provision of an improved and novel sugar cane stripper and topper which will satisfactorily and successfully accomplish the work under any and all the varying and difficult conditions involved in harvesting the cane, and with this end in view, I provide an improved sugar cane stripper and topper of strong, comparatively light, and compact construction having novel means for stripping the dead leaves from the cane; novel means for arranging or adjusting the cane of different lengths to prepare it for the topping operation; novel means for severing the tops or topping the cane thus arranged; and novel means for discharging the cane from the machine so that it can be conveniently transported to the mill, together with various improved and novel instrumentalities, all of which are set forth fully hereinafter and recited in the appended claims, while in the accompanying drawings:

Figure 1 is a side elevation of the complete cane harvester; Fig. 2, a sectional plan view on line 2—2 of Fig. 1, with the shield removed; Fig. 3, rear sectional elevation on line 3—3 of Fig. 1; Fig. 4, a front elevation; Fig. 5, a sectional detail of one of the adjustable topping cutters and adjacent gears and wheels.

The main frame 1 is surmounted by a superstructure 2 and is supported on the traction or drive wheels 3 and front or steering wheels 4. While any preferred driving mechanism for propelling, operating, and steering the machine may be used, I have found it desirable to employ that shown, consisting of an internal combustion engine 7 having power shaft 8 connected by drive chain 10 to countershaft 12, on which is transmission gear 13 which, in turn, is geared to another countershaft 17 by sprocket chain 15. Gears 18 and 19 operatively connect shaft 17 with a shaft 20 which is geared to gears 22ª on the respective traction wheels 3 by sprocket chains 22. Any suitable controlling mechanism for the propelling mechanism may be employed. The steering mechanism 5 is operated by connecting rod 5ª, gears 5ᵇ, shaft 5ᶜ, gears 5ᵈ and clutch 5ᵉ on shaft 12. Any suitable controlling mechanism for clutch 5ᵉ may be employed.

Hinged at 75 to the front of frame 1, which is bifurcated and has converging adjacent sides, are pointed guide frames 52, supported by small wheels 53.

Shafts 26 which are operatively connected at their rear ends with shaft 17 by the sets of spiral gears 24, carry at their forward ends bevel gears 27 which mesh with corresponding gears 28, which by the parts 29, 30, arranged in a boxing 76, drive the severing knives 31. Cables 32 running over pulleys 33 and winding on drums 34 on a shaft 35, operable by a hand lever 36 disposed conveniently to the operator's seat 77, maintain the cutters where desired.

Secured to the shafts 30 are sprocket wheels 50 around which and other sprocket wheels 78 and 79 run sprocket chains 51 having fingers. These chains also pass around sprockets (not shown) which are journaled to the machine frame at the side of sprockets 50, said chains being thus arranged with stretches parallel and the fingers nearly touching, while the forward portions of these chains diverge to draw in the cane to pass it to the parallel portions of the chains.

Arranged in pairs disposed at different heights are stripping brushes 40ª, 40ᵇ, 40ᶜ, 40ᵈ, suitably journaled in the frame 2, while screw conveyers 42ª, 42ᵇ, 42ᶜ are arranged in pairs intermediate the respective pairs of stripping brushes; the brushes and screw conveyers are disposed in parallel relation to each other. The stripping brushes and screw conveyers are all geared together by sprocket chains 41 and the lowermost brushes are operatively connected to the shafts 26 by sprocket chains 38 running over sprocket wheels 39 on the shafts of the brushes 40ª. The sprocket wheels and chains are so arranged that the brushes on one side will revolve faster than those on the other side of the cane so that the flexible steel fingers 80 of the brushes will have a scraping action on both sides of the stalks and thus effectually strip them of their leaves.

In the upper part of the frame 2 are journaled pairs of vertically disposed shafts 45 and 45', the former being driven from the series of sprocket chains 41 by bevel gears 43, 44. Sprocket chains 47ª, 47ᵇ, 47ᶜ, having fingers or prongs 81, pass around sprocket wheels 46ª, 46ᵇ, 46ᶜ on the respective shafts 45 and around similar sprocket wheels on shafts 45'. The rear sprocket wheels 46ᵇ have secured to their hubs rotary or disk cutters or knives 48 which overlap slightly and constitute topping knives for severing the tops from the stalks. The sprocket wheels 46ᵇ are slidable up and down on the shafts 45 and 45' so that the cutters 48 may be brought to any desired height. Suitable means 82 are employed for securing the sprocket wheels 46ᵇ to shafts 45 and 45'.

Above the sprocket chains 47ᶜ is a flat shield or abutment 49 against which the tops of the stalks strike whereby the stalks are all brought to the desired vertical position for topping.

The pairs of screw conveyers 42ª, 42ᵇ, 42ᶜ, are continued rearwardly and below them is a platform 54 onto which the butts of the stalks drop after the topping operation to be conveyed by said screw conveyers to the rear of the machine for reception into any suitable cart for transportation to the mill.

The operation of the machine is as follows: As the machine is propelled into the field by the engine 7 and controlled and steered by the operator, the front and rear wheels 4 and 3 straddling a row or hill, the guides 52 rise and fall according to inequalities in the contour of the ground and gather in any blown over cane, forcing it into more or less upright position on account of their convergence and the upward slope of their tops, and of the front of frame 1 until it reaches the converged portions of the pronged chains or conveyers 51 which guide the stalks into the space between the straight portions of said chains or conveyers, the fingers or prongs passing it along and holding it in upright position. By the time the stalks reach the rotary cutters or severing knives 31, they will be engaged by the spiral or screw conveyers 42ª, 42ᵇ, 42ᶜ, and the rotary stripping brushes 40ª, 40ᵇ, 40ᶜ, 40ᵈ, and immediately upon severance of the stalks by the rotary cutters 31, the combined action of the screw or spiral conveyers and the stripping brushes will carry the stalks upwardly and toward the rear of the machine, the stripping brushes revolving in an upward direction, and inasmuch as the stripping brushes on one side of the machine revolve faster than those on the other side of the machine, the stalks in passing between the pairs of stripping brushes will be subjected to a scraping action by the flexible fingers 80, thus effectually removing the leaves. The relative speeds of the spiral or screw conveyers and the stripping brushes are such that the upper ends of the smaller stalks will reach the shield 49 before they have been carried back by the screw conveyers to the topping knives 48. After the tops of the stalks reach the shield or abutment 49, the stripping brushes hold them thereagainst while the screw conveyers, assisted by the pronged conveyers 47ª, 47ᵇ, 47ᶜ, carry the stalks to the rear through the topping knives or cutters 48 which sever the tops from the stalks. The topping cutters or knives 48 are kept at the proper height to suit the lengths of the tops of the cane. After the topping operation, the stalks drop down onto the platform 54 which supports them in upright position while the rearward extensions of the screw conveyers 42ª, 42ᵇ, 42ᶜ, pass them along and off the rear of the machine into a suitable cart or onto the ground.

Having thus described my invention, what I claim as new and desire to secure by Letters Patent, is:—

1. In a cane stripper, a movable stripper for stripping the cane upwardly in relation to the leaves thereof, in combination with a conveyer for passing the cane through said stripper in a general sidewise direction during the stripping operation.

2. In a cane stripper, rotary strippers adapted to both strip and advance the cane, in combination with a conveyer for passing the cane sidewise in the direction of the length of said rotary strippers during the stripping operation.

3. In a cane stripper, rotary strippers having flexible fingers for stripping the cane lengthwise thereof, in combination with means for moving the cane sidewise in the direction of the length of said rotary strippers during the stripping operation.

4. In a cane stripper, the combination with rotary strippers adapted to both advance and strip the cane, of screw conveyers for passing the cane through said strippers.

5. In a cane stripper, an adjustable topping cutter, in combination with conveyers having flexible means for presenting the stalks thereto, whereby the tops of the stalks can be cut off at any desired distance from the upper ends of the stalks.

6. In a cane stripper, the combination with means for adjusting the individual severed stalks, of an adjustable cutter for severing the tops from the severed stalks in any desired lengths.

7. In a cane stripper, a shield or abutment for the severed stalks, in combination with topping mechanism adjustable in relation to said shield or abutment, whereby the tops of the stalks can be cut off in any desired lengths.

8. In a cane stripper, the combination with a shield or abutment for holding the stalks in adjusted position for topping, of rotary shafts, rotary cutters adjustably secured on said shafts and shiftable therealong to different positions, whereby the tops may be severed at any desired distance from the upper ends of the stalks, and flexible conveyers for delivering the stalks to the shield or abutment and to the cutters aforesaid.

In testimony whereof, I hereunto affix my signature in presence of two witnesses.

FRANCIS M. COCKRELL, Jr.

Witnesses:
JAS. P. PARKERSON,
P. KRAMER.